United States Patent [19]

Hirooka et al.

[11] 3,964,955

[45] June 22, 1976

[54] BONDING METHOD USING OLEFIN-ACRYLIC ESTER COPOLYMER

[75] Inventors: Masaaki Hirooka; Yoshikazu Fujii; Shigeru Morita, all of Ibaragi; Isamu Namazue, Toyonaka; Kazuhiko Hata, Takatsuki, all of Japan

[73] Assignee: Sumitomo Chemical Company, Limited, Osaka, Japan

[22] Filed: May 29, 1974

[21] Appl. No.: 474,177

[30] Foreign Application Priority Data
June 2, 1973  Japan.............................. 48-62174

[52] U.S. Cl................................ 156/332; 156/333; 156/334
[51] Int. Cl.² ........................................... C09J 7/02
[58] Field of Search................ 117/122 H; 427/207; 156/332, 333, 334

[56] References Cited
UNITED STATES PATENTS

| | | | |
|---|---|---|---|
| 2,915,490 | 12/1959 | Hopper | 117/122 X |
| 3,695,922 | 10/1972 | Chujo et al. | 117/122 X |
| 3,698,934 | 10/1972 | Eichhorn et al. | 117/122 X |
| 3,734,798 | 5/1973 | Dooley | 117/122 |
| 3,753,769 | 8/1973 | Steiner | 117/122 |

FOREIGN PATENTS OR APPLICATIONS 1,089,279  11/1967  United Kingdom

*Primary Examiner*—Bernard D. Pianalto
*Attorney, Agent, or Firm*—Stevens, Davis, Miller & Mosher

[57] ABSTRACT

A method for bonding solid materials by use of a copolymer comprising at least one olefin having 3 to 20 carbon atoms and at least one acrylic ester compound containing an alcohol residue having 1 to 20 carbon atoms and at least one functional ethylenically unsaturated compound from among acryloyl halides or maleic anhydride.

19 Claims, No Drawings

BONDING METHOD USING OLEFIN-ACRYLIC ESTER COPOLYMER

This invention relates to a novel method for bonding solid materials. More particularly, the invention pertains to a method for bonding solid materials by use of a copolymer comprising an olefin and an acrylic ester compound.

Heretofore, copolymerization of olefins such as propylene and isobutylene with acrylic esters was difficult because, owing to degradative chain transfer reaction of the olefins, the yield and molecular weight of the resulting copolymers were greatly lowered, and no sufficient amounts of the olefins could be introduced into the copolymers. The present inventors already found that high molecular weight copolymers of olefins with acrylic esters can be obtained in high yields by use of metal halides such as alkylaluminum halides. What is of particular importance is the finding that due to polarity of the esters and non-polarity of the olefins, the above-mentioned high molecular weight copolymers have favorable affinity for and compatibility with an extremely wide variety of materials to be bonded. The solubility parameters of the olefin-acrylic ester copolymers are far smaller than those of acrylic ester homopolymers, and this indicates that the said copolymers are well compatible with hydrocarbon compounds, the presence of ester groups enables the said copolymers to have affinity also for polar compounds, and the small contact angles thereof signify that the said copolymers can well wet the surfaces of various solid materials. What is of further importance is the finding that most of the olefin-acrylic ester copolymers are tacky, excellent in heat resistance, highly resistant to thermal and oxidative degradation at elevated temperatures, favorable in weather resistance, and far more excellent in water resistance and hydrolysis resistance than the conventional polyacrylates and polyvinyl acetates. In view of the above-mentioned characteristic properties, the present inventors have found that the copolymers (I) composed mainly of olefins and acrylic esters have excellent properties as adhesives and tackifiers, and can be used as adhesives which are widely applicable to various solid materials.

An object of the present invention is to provide a method for bonding solid materials by use of a specific adhesive.

Another object of the invention is to provide an adhesive capable of bonding any solid materials.

Other objects and advantages of the invention will become apparent from the following description.

In accordance with the present invention, there is provided a method for bonding solid materials, characterized by using a copolymer comprising at least one olefin having 3 to 20 carbon atoms and at least one acrylic ester compound containing alcohol residue having 1 to 20 carbon atoms. The said copolymer may be a random or alternating copolymer, but is preferably an alternating copolymer.

The olefins used in the present invention are ethylenically unsaturated hydrocarbon compounds having 3 to 20 carbon atoms, or halogen-substituted derivatives thereof. Chiefly, aliphatic and alicyclic compounds and halogen-substituted derivatives thereof are widely used. The halogen-substituted compounds in which the halogen is attached to a carbon other than the carbon-carbon double bond are preferably used. The compounds may be either terminal- or internal-unsaturated compounds. Especially, aliphatic α-olefins are preferable, and isobutylene and propylene are particularly useful. Concrete examples of the olefins include propylene, isobutylene, butene-1, pentene-1, 2-methylbutene-1, 2-methylpentene-1, hexene-1, butene-2, 4-methylpentene-1, 2-methyl-4-phenylbutene-1, octadecene, β-methallyl chloride, 2-methyl-4-chloropentene-1, norbornene and indene.

The acrylic ester compounds used in the present invention are acrylic esters and α- or β-substituted acrylic esters containing alcohol residues having 1 to 20 carbon atoms. Particularly, acrylic esters containing as the alcohol residues hydrocarbon groups or halogen-substituted hydrocarbon groups having 1 to 20 carbon atoms are preferable. As the α- and β-substituents, hydrocarbon or halohydrocarbon groups having 1 to 8 carbon atoms are preferable. As the alcohol residues, there may be used any hydrocarbon groups such as alkyl, alkenyl, aryl, aralkyl, aralkenyl, alkenylaryl, alkylaryl, cycloalkyl and cycloalkenyl groups, or halogen-substituted derivatives thereof. In case a copolymer having high tackiness at ordinary temperature is required, it is preferable to use alcohol residues having 4 or more carbon atoms. Concrete examples of the acrylic ester compounds include methyl acrylate, ethyl acrylate, isopropyl acrylate, n-butyl acrylate, n-hexyl acrylate, 2-ethylhexyl acrylate, n-octyl acrylate, n-decyl acrylate, lauryl acrylate, stearyl acrylate, cyclohexyl acrylate, phenyl acrylate, allyl acrylate, crotyl acrylate, 2-chloroethyl acrylate, chloroallyl acrylate, methyl methacrylate, n-butyl methacrylate, methyl α-chloroacrylate and n-butyl α-chloromethyl acrylate.

The olefin-acrylate copolymers (I) used in the present invention have, in general, a high molecular weight, and those having an intrinsic viscosity of, for example, from 0.1 to 10 dl/g as measured in benzene at 30°C are effectively used. The composition of the copolymers preferably comprises 5 to 60 mole%, particularly 30 to 50 mole%, of the olefin and 40 to 95 mole%, particularly 50 to 70 mole%, of the acrylate. In the present invention, important are alternating copolymers which have about 50 mole% of olefin and about 50 mole% of acrylate.

The copolymers (I) used in the present invention are copolymers of olefins with acrylic ester compounds, and include those which have been modified by graft polymerization or other high polymer reactions. Alternatively, the copolymers may be brought to interpolymers by introduction of at least one third component monomer. When a functional group is introduced into the copolymer of the present invention according to any of the above-mentioned procedures, the adhesiveness of copolymer can be enhanced. Generally, the amount of the functional group to be introduced into the copolymer is less than 30 mole%, preferably 0.1 to 10 mole%, based on the amount of the copolymer. Examples of preferable functional groups are carboxyl groups, acid anhydride groups, acid halide groups, aldehyde groups, hydroxyl groups, ether groups, epoxy groups, isocyanate groups, amide groups, amino groups nitrogen-containing cyclic compound groups and nitrile groups, though these are not limitative. Particularly, as the functional ethylenically unsaturated compounds to be introduced by copolymerization, preferable are ethylenically unsaturated compounds having the general formula,

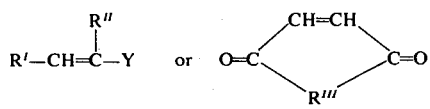

wherein $R^I$ and $R^{II}$ are individually a hydrogen atom, a halogen atom, a hydrocarbon or halohydrocarbon group having 1 to 8 carbon atoms, or Y; Y is a group containing a functional group having 1 to 20 carbon atoms and selected from carboxyl, acid anhydride, acid halide, aldehyde, amide, nitrogen-containing cyclic compound and nitrile groups; $R^{III}$ is an oxygen atom, or a group $N-R^{IV}$ (where $R^{IV}$ is a hydrogen atom, or a hydrocarbon or halohydrocarbon group having 1 to 8 carbon atoms). As the hydrocarbon or halohydrocarbon groups, there are advantageously used alkyl, alkenyl, aryl, alkylaryl, aralkyl and cycloalkyl groups and halogen-substituted derivatives thereof. Preferable examples thereof are acrylic acid, acryloyl halides, acrylamides, maleic anhydride, maleimide, fumaric acid, maleic acid, acrylonitrile, vinylpyridine, acrolein and their derivatives.

Concrete examples of monomers suitable for the above-mentioned purposes include acrylic acid, methacrylic acid, crotonic acid, itaconic acid, acryloyl chloride, methacryloyl chloride, acryloyl bromide, methacryloyl bromide, acrylamide, N-methylacrylamide, N,N-diethylacrylamide, methacrylamide, N,N'-dimethylaminoethyl methacrylate, maleic anhydride, maleimide, N-methylmaleimide, maleic acid monoamide, N-methylmaleic acid nonoamide, maleic acid diamide, N,N'-dimethylmaleic acid diamide, fumaric acid, fumaric acid monoamide, maleic acid, acrylonitrile, methacrylonitrile, maleodinitrile, fumarodinitrile, N-vinylpyridine, 2-vinylpyridine, 2-methyl-N-vinylpyridine, acrolein, methacrolein and crotonaldehyde. These may be used either alone or in combination of two or more.

The copolymer used in the present invention can be preferably prepared by copolymerizing the above-mentioned monomers in the presence of a Lewis acid compound such as a metal halide capable of forming a complex with the carbonyl group of acrylic ester. According to this process, degradative chain transfer reaction due to olefin is scarcely brought about to give favorable results. As the said Lewis acid compound, there may be used any compound capable of forming a complex with the lone pair of carbonyl group. For example, a halide of an element of Group IIb, IIIb, IVb, Vb or VIII of the Periodic Table may be used. Particularly, a halide of aluminum or boron is preferable. The complex copolymerization carried out in the presence of said compound is effectively initiated with a radical polymerization catalyst, oxygen, an organometallic compound, light or radiation, and proceeds. For preparation of an alternating copolymer, there may be adopted any of the processes described in detail in, for instance, British Patent Nos. 1,187,105 and 1,280,030; and French Patent No. 72.24708. Particularly, a system using as catalyst an organoaluminum halide or an organoboron halide or a component corresponding thereto is preferable. In this kind of alternating copolymerization, the third monomers react with the same reactivity as that of the olefin or the acrylate depending upon the kind of the third monomers, which are classified, for example, in British Patent No. 1,187,105.

The copolymer (I) used in the present invention is, of course, inherently high in adhesiveness, and hence is not always required to be incorporated with other additives. For economical reasons and/or for enhancement of inherent adhesiveness, however, the copolymer may frequently be incorporated with at least one additive selected from the group consisting of extenders, fillers, softeners, hardeners, tackifiers, stabilizers and other conventional additives (II). That is, the copolymer (I) may be used in admixture with, or if necessary in chemical combination with, any of many high molecular weight compounds, e.g. those of elastomer type, such as natural rubber, styrene-butadiene copolymers, butadiene-acrylonitrile copolymers, chloroprene rubbers, butadiene rubbers, isoprene rubbers, chlorosulfonated polyethylenes, acrylic rubbers, urethane rubbers, chlorinated polyethylenes, epichlorohydrin rubbers, polysulfides, silicone rubbers, polyisobutylenes, butyl rubbers and chlorinated polypropylenes and derivatives thereof; vinyl type polymers such as polyacrylic esters, polymethacrylic esters, polyvinyl acetals, polyvinyl acetate, polyvinyl alcohol, polystyrene, polyvinyl chloride and polyvinylidene chloride and copolymers of these vinyl monomer components; those of cellulose type such as cellulose, nitrocellulose, cellulose acetate, cellulose butyrate, ethyl cellulose, carboxymethyl cellulose and cyanoethyl cellulose; and those of condensation type such as polyethers, polyesters and polyamides. If desired, a filler may also be incorporated into the adhesive composition of the present invention. Examples of the filler include rubber-reinforcing powders such as carbon black and finely divided silica; non-reinforcing inorganic powders such as clay, finely divided alumina, calcium carbonate, titanium oxide, zinc oxide, magnesium oxide and barium sulfate; inorganics such as bentonite; and powders of natural products such as wood flour and wheat flour. The amounts of these fillers can easily be decided so as to be suitable for use in adhesives. However, the additive (II) that is preferably incorporated into the copolymer (I) used in the present invention is a synthetic or natural resin which is compatible with said copolymer (I) and which is brought to a relatively fluid or plastic state at temperatures of 50° to 160°C. Examples of the resin include rosin, derivatives of natural rosin (e.g. dehydrogenated rosin, hydrogenated rosin, esters of hydrogenated rosin with glycerin or pentaerythritol, and polymerized rosin), dammar, polyterpene resins (e.g. α-pinene, β-pinene and diterpene polymers), modified terpene resins (e.g. terpene-phenol resins and α-pinene-phenol copolymers), aliphatic hydrocarbon resins, cyclopentadiene resins, aromatic petroleum resins, phenolic resins (e.g. alkylphenol resins and modified phenol resins), styrene resins, xylene type resins, cumarone-indene resins, vinyltoluene-α-methylstyrene copolymers and chlorinated hydrocarbon resins. The relative amount of the resin in the final adhesive composition is variable in the range of 1 to 1,000 parts by weight, preferably 5 to 800 parts by weight, per 100 parts by weight of the copolymer (I). In case the adhesive composition is desired to be used as an adhesive or tackifier required to be high in bending strength of the resulting layer, the resin is preferably used in a proportion of about 1 to 100 parts by weight per 100 parts by weight of the copolymer (I). In case the adhesive composition is desired to be used as a heat-fusible adhesive required to be favorable in shearing force and peeling strength, the resin is preferably used in such a large proportion as about 100 to 1,000 parts by weight per 100 parts by weight of the copolymer (I). In the case where low temperature flexibility and sufficient softness and fluidity are required, the adhesive composition may be incorporated with any of low molecular weight plasticizers of the phthalate type such as dioctyl phthalate, dibutyl phthalate and butylbenzyl phthalate, of the phosphate type such as tricresyl phosphate and of the adipate type such as dibutyl adipate and dioctyl adipate, animal and vegetable oils, mineral oils, and low molecular weight polymers. For enhancement in efficiency, the copolymer (I) used in the present invention may be incorporated with an antioxidant, a stabilizer or a crosslinking agent. Generally, the amount of said additive is less than 300 parts by weight per 100 parts by weight of the copolymer (I).

Heretofore, there have been used high molecular weight adhesives of the thermosetting type (e.g. urea, melamine, phenol, resorcinol, epoxy, polyester, polyurethane and polyaromatic type adhesives), the thermoplastic type (e.g. polyvinyl acetate, polyvinyl alcohol, polyvinyl acetal, polyvinyl chloride, polyacrylate, polyamide, polyethylene, cellulose and polyvinyl ether type adhesives), and the elastomer type (e.g. chloroprene rubber, nitrile rubber, styrene rubber, polysulfide, butyl rubber and silicone rubber type adhesives). The adhesive composition comprising the copolymer (I) used in the present invention may be used also in combination with such an existing adhesive.

According to its application purpose, the adhesive composition comprising the copolymer used in the present invention may, if desired, be used in combination with various primers, whereby the adhesive composition can be enhanced in adhesiveness.

Another characteristic of the copolymer used in the present invention is that it can be used in very many manners, and hence, the following procedures can be applied to the copolymer:

1. The copolymer can be used in the molten state. That is, it can be used as a so-called hot melt type adhesive. In this case, the characteristic features of the copolymer of this invention that the heat fusibility, heat resistance, compatibility with various additives, and the like are excellent are successfully displayed.

2. The copolymer can be used in the form of a solution. That is, the copolymer is dissolved in a solvent, and the resulting solution is coated on the surfaces of materials to be bonded and then the solvent is removed. Depending on its application purpose as an adhesive, the copolymer solution as such may alternatively be used as an adhesive. As the solvent in the above case, there may be used any of aromatic hydrocarbons, halogenated hydrocarbons, ketones, ethers, esters and amides. Preferable examples of the solvent include benzene, toluene, xylene, perchloroethylene, trichloroethylene, acetone, methylethylketone, cyclohexanone, tetrahydrofuran, ethyl acetate and dimethylformamide. The concentration of the copolymer in the solution is not particularly limited, but is ordinarily 1 to 50 wt%, preferably 5 to 45 wt%. The viscosity of the solution is 1 to 100,000 centipoises, preferably 10 to 30,000 centipoises.

3. The copolymer can be used in the form of an emulsion. That is, it can be used as a so-called aqueous emulsion type adhesive. Such an emulsion can be prepared in various manners. Generally, however, the emulsion is prepared by synthesizing the copolymer according to emulsion polymerization, or by dissolving the synthesized copolymer in a solvent, dispersing the resulting solution in water and then removing the solvent. Particularly when preparation of the emulsion is carried out in the presence of a proper surfactant, a stable and well-dispersed aqueous emulsion can be obtained. This kind of surfactant for dispersion purpose is preferably used in a proportion of 0.1 to 20 parts by weight per 100 parts by weight of the copolymer. The surfactant may be any of anionic, nonionic and cationic surfactants, but is preferably a nonionic or anionic surfactant. Examples of the surfactant include sodium laurylbenzenesulfonate, sodium laurylnaphthalenesulfonate, sodium dioctylsulfosuccinate, sodium oleate, potassium salt of castor oil, sodium lauryl alcohol sulfate, sodium polyacrylate and polyoxyethylene methyl ether. Alternatively, the use of mixtures of said surfactants with ammonium salts or alkali metal salts of higher fatty acids or organic acids such as rhodinic and tetrahydroabietic acids can also accomplish the dispersion purpose. Further, the use of a phosphate such as sodium orthophosphate, or ethylenediamine tetraacetic acid or its salt, is effective for maintaining the emulsion stably.

In the present invention, any solid materials may be used as the materials to be bonded, and plastics, rubbers, leathers, films, papers, cloths, metals, glass, ceramics, slate and concrete can be bonded. That is, various functional groups may be introduced into the copolymers used in the present invention, so that such functional groups as to increase the bonding strength according to the properties of materials to be bonded can be incorporated into the copolymers.

The present invention is illustrated in detail below with reference to Examples, but the invention is not limited to the Examples. In the Examples, the intrinsic viscosity was measured in benzene at 30°C.

EXAMPLE 1

A mixture comprising 40 g of an isobutyleneethyl acrylate alternating copolymer having an intrinsic viscosity of 0.66 dl/g and 60 g of WW Hongkong Rosin was heated to a temperature of 175°C to form a melt having a viscosity of 5,940 cps. This melt was coated to a thickness of 0.01 mm on a cotton cloth drill 9A of 10 × 15 cm in size. Immediately thereafter, an aluminum foil was placed on the coated side of the cloth, and lightly pressed once with a steel roller of 47 kg. After cooling, the cloth was cut to a width of 25 mm to prepare a test piece. This test piece was subjected to tensile peeling test to show a peeling strength of 3.8 kg/25 mm. A test piece was prepared in the same manner as above, except that draft paper was used in place of the cloth, and then subjected to the same test as above to show such a high peeling strength that the paper was broken. A control test sample prepared in the same manner as above, except that an ethylene-vinyl acetate copolymer (vinyl acetate content 20%, melt index 150) was used as the adhesive, showed a peeling strength of 1.9 kg/25 mm.

On the other hand, test samples were prepared by bonding a polyethylene sheet to a cotton broadcloth No. 40 with each of the adhesive according to the present invention and the same ethylene-vinyl acetate copolymer as mentioned above. The test sample prepared by using the adhesive of the present invention showed peeling strength of 22.1 kg/25 mm, whereas the test sample using the said copolymer showed a peeling strength of only 1.1 kg/25 mm.

EXAMPLE 2

To 35 g of an isobutylene-2-ethylhexyl acrylate alternating copolymer having an intrinsic viscosity of 0.31 dl/g were added 20 g of a paraffin wax (m.p. 130°F) and 45 g of WW Hongkong Rosin, and the resulting adhesive was heated to a temperature of 175°C to form a melt having a viscosity of 78 cps. This melt was coated to a thickness of 0.01 mm on a cotton cloth drill 9A of 10 × 15 cm in size. Immediately thereafter, an aluminum foil was placed on the coated side of the cloth, and lightly pressed once with a steel roller of 47 kg. After cooling, the cloth was cut to a width of 25 mm to prepare a test piece. This test piece was subjected to tensile test to show a peeling strength of 1.7 kg/25 mm.

The same melt as above was coated to a thickness of 0.01 mm on a kraft paper and then cooled. The coated paper was heated at 150°C for 3 seconds, and an uncoated paper was placed on the coated paper and then bonded thereto under a pressure of 5 kg/cm² to prepare a sample. When the sample was subjected to a tensile tester, the paper could not be peeled but was broken.

EXAMPLE 3

A mixture comprising 20 parts by weight of an isobutylene (50 mole%)-ethyl acrylate (50 mole%) copolymer having an intrinsic viscosity of 2.0 dl/g and 80 parts by weight of an isobutylene (50 mole%)-2-ethylhexyl acrylate (50 mole%) copolymer having an intrinsic viscosity of 0.74 dl/g was dissolved in toluene to obtain a 40 wt% rubber cement. This rubber cement was coated by means of a knife coater on the surface of a cured rubber sheet comprising a blend of ethylene-propylene rubber and butyl rubber, dried at room temperature to completely remove the toluene, and then press-bonded to a material to be bonded to prepare a sample. The press-bonding was conducted at room temperature by application of only a finger pressure. The sample was allowed to stand at room temperature for 4 hours, and then peeled by means of an autograph. The peeling was carried out by cutting the sample to a test piece of 150 (L) × 200 (W) mm and then subjected to peeling at a speed of 50 mm/min at 180° C. The bonding strengths of the rubber cement to such materials to be bonded as slate, veneer sheet, concrete and iron plate were 2.5, 4.5, 2.3 and 4.8 kg/20 mm, respectively.

EXAMPLE 4

|  | (1) | (2) |
|---|---|---|
| Isobutylene (50 mole%)-ethyl acrylate (50 mole%) copolymer ([η] 2.0 dl/g) | 20 parts by weight | 40 parts by weight |
| Isobutylene (50 mole%)-2-ethylhexyl acrylate (50 mole%) copolymer ([η] 0.74 dl/g) | 80 parts by weight | 60 parts by weight |
| t-Butylphenol resin (Tamanol 521, produced by Arakawa Rinsan Co.) | 45 parts by weight | 45 parts by weight |
| Magnesia (MgO) | 5 parts by weight | 5 parts by weight |
| Water | 3 parts by weight | 3 parts by weight |

In the same manner as in Example 3, samples were prepared by using rubber cements obtained from the above-mentioned blends (1) and (2), and by using slate as the material to be bonded, and subjected to the peeling test to measure the bonding strengths of said cements at various temperatures. The bonding strengths at elevated temperatures were measured immediately after putting the samples for 30 minutes in a thermostat kept at a definite temperature. The results obtained were as set forth in Table 1.

Table 1

|  | (1) | (2) |
|---|---|---|
| Room temperature | 3.5 kg/20 mm | 2.7 kg/20 mm |
| 40°C | 3.1 kg/20 mm | 2.4 kg/20 mm |
| 50°C | 2.5 kg/20 mm | 2.0 kg/20 mm |
| 60°C | 2.0 kg/20 mm | 1.6 kg/20 mm |

As is clear from the results shown in Table 1, it has been found that when used as adhesives, the above-mentioned blends (1) and (2) can successfully bond the slate to the cured rubber sheet comprising a blend of ethylene-propylene rubber and butyl rubber, and thus are quite useful as adhesives for waterproof, pressure-sensitive adhesive sheets or various adhesive tapes.

EXAMPLE 5

A 35 wt% toluene solution of a copolymer ([η]0.70 dl/g) comprising 50 mole% of isobutylene, 45 mole% of methyl acrylate and 5 mole% of maleic anhydride, in which isobutylene had alternately bonded to methyl acrylate and maleic anhydride, was coated on a film on which aluminum had been vacuum-deposited. In the resulting solution layer was embedded glass beads having an average diameter of 60 μ, and then dried at 140°C for 10 minutes to prepare a composite. This composite was excellent in adhesion between aluminum and glass beads, and even when the composite was rubbed with the hand in the presence of water, the glass beads did not come off with ease.

EXAMPLE 6

An isobutylene-ethyl acrylate alternating copolymer having an intrinsic viscosity of 0.92 dl/g was formed into a 48% aqueous emulsion of copolymer particles of 1 μ in size, and was measured in strength of bonding films to cloths. For the measurement, a polyvinyl chloride film (thickness 0.5 mm), an acetyl cellulose film (thickness 0.08 mm), a Mylar film (thickness 0.03 mm) and a polystyrene film (thickness 0.08 mm) were individually used as materials to be laminated to a cotton cloth drill 9A, and the resulting laminated sheets were tested in the manner described below.

Each film of 100 mm × 150 mm in size was coated with the emulsion by use of a rod. Immediately thereafter, the cloth cut to the same size as above was placed on the coated film, and the resulting laminate was once rolled with a rubber roller of 4.7 kg to form a sheet. After air-drying for 1 hour, the sheet was cut to strips of 30 mm and then cured for 48 hours at 20°C and 65% RH (normal bonding). Using an Instron tester, the strips were measured in T-peeling strength at a crosshead speed of 50 mm/min.

In order to know the thermal deterioration resistance of the emulsion, the strips, which had been put for 48 hours at 20°C and 65% RH, were stored for one week in a thermostat kept at 50°C and then measured in thermal deterioration resistance.

The results of measurements were as set forth in Table 2.

Table 2

| | Normal bonding strength | Thermal deterioration resistance |
|---|---|---|
| Cloth-PVC film | 0.24 kg/30 mm | 0.68 kg/30 mm |
| Cloth-polystyrene film | 0.08 kg/30 mm | 0.38 kg/30 mm |
| Cloth-Mylar film | 0.10 kg/30 mm | 0.31 kg/30 mm |
| Cloth-acetyl cellulose film | 0.49 kg/30 mm | 0.65 kg/30 mm |

As is clear from the results shown in Table 2, the emulsion used as the adhesive was markedly excellent in thermal deterioration resistance and was also favorable in bonding strength.

EXAMPLE 7

Polymer solution (I):

| | |
|---|---|
| Isobutylene (50 mole%)-methyl acrylate (45 mole%)-acryloyl chloride (5 mole%) copolymer ([η] 1.28 dl/g) | 100 parts by weight |
| Phenol-formaldehyde resin (Tackirol 130G, produced by Sumitomo Chemical Co.) | 75 parts by weight |
| Toluene | 700 parts by weight |

Polymer solution (II):

| | |
|---|---|
| Isobutylene (50 mole%)-methyl acrylate (45 mole%)-acryloyl chloride (5 mole%) copolymer ([η] 1.28 dl/g) | 100 parts by weight |
| Phenol-terpene type resin (Sumilite Resin PR 50530, produced by Sumitomo Durez Co.) | 75 parts by weight |
| Toluene | 700 parts by weight |

Each of the above-mentioned polymer solutions (I) and (II) having a viscosity of 200 cps. at room temperature was coated by use of an applicator to a thickness of 2 mils on the surfaces of rigid polyvinyl chloride sheet and polyester film which had been cleaned with methyl ethyl ketone. After air-drying for 15 minutes, the said polyvinyl chloride sheet and polyester film were bonded together under a pressure of 10 kg/cm². The resulting laminate was allowed to stand for 24 hours and then subjected to peeling test. The peeling test was carried out by peeling the polyvinyl chloride sheet at an angle of 180° at a jaw-moving speed of 50 mm/min at 20°C. The bonding strengths of the solutions (I) and (II) were as follows:

I. 2.6 kg/25 mm
II. 2.3 kg/25 mm
(Bonded material: Polyester-rigid polyvinyl chloride)

What is claimed is:

1. In a method for the bonding of solid materials wherein an adhesive is applied to the surface of the solid materials to be bonded before contacting said solid surfaces, the improvement consisting of utilizing as said adhesive a composition comprising an interpolymer containing 5 to 60 mole percent of at least one olefin unit having 3–20 carbon atoms, 40–95 mole percent of at least one acrylic ester unit having an alcohol residue containing 1–20 carbon atoms and 0.1 to 30 mole percent of at least one functional ethylenically unsaturated compound from among acryloyl halides, having the formula

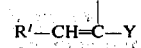

$$R^I-CH=C-Y \atop | \atop R^{II}$$

or maleic anhydride, wherein $R^I$ and $R^{II}$ are individually a hydrogen atom, a halogen atom, a hydrocarbon or halohydrocarbon group having 1 to 8 carbon atoms, or wherein Y is an acid halide group, said interpolymer having an intrinsic viscosity of 0.1 to 10 dl/g as measured in benzene at 30°C.

2. A method according to claim 1, wherein the functional ethylenically unsaturated compound is acryloyl chloride, methacryloyl chloride, acryloyl bromide or methacryloyl bromide.

3. A method according to claim 1, wherein the olefin is selected from the group consisting of ethylenically unsaturated hydrocarbons and halogen-substituted derivatives thereof.

4. A method according to claim 1, wherein the olefin is selected from the group consisting of aliphatic olefins and alicyclic olefins.

5. A method according to claim 1, wherein the olefin is an aliphatic α-olefin.

6. A method according to claim 1, wherein the olefin is isobutylene or propylene.

7. A method according to claim 1, wherein the acrylic ester compound is selected from the group consisting of acrylic esters, α-substituted acrylic esters and β-substituted acrylic esters.

8. A method according to claim 7, wherein the α-substituents and β-substituents are halogens, or hydrocarbon groups or halohydrocarbon groups having 1 to 8 carbon atoms.

9. A method according to claim 1, wherein the alcohol residue is selected from the group consisting of alkyl, alkenyl, aryl, aralkyl, aralkenyl, alkenylaryl, alkylaryl, cycloalkyl and cycloalkenyl groups and halogen-substituted derivatives thereof.

10. A method according to claim 1, wherein the acrylic ester compound is selected from the group consisting of methyl acrylate, ethyl acrylate, isopropyl acrylate, n-butyl acrylate, n-hexyl acrylate, 2-ethylhexyl acrylate, n-octyl acrylate, n-decyl acrylate, lauryl acrylate, stearyl acrylate, cyclohexyl acrylate, phenyl acrylate, allyl acrylate, crotyl acrylate, 2-chloroethyl acrylate, chloroallyl acrylate, methyl methacrylate, n-butyl methacrylate, methyl α-chloroacrylate and n-butyl α-chloromethylacrylate.

11. A method according to claim 1, wherein the solid materials are plastics, rubbers, leathers, papers, cloths, metals, glass, ceramics, slate or concrete.

12. A method according to claim 1, wherein the copolymer is applied in the form of an aqueous emulsion to the solid materials.

13. A method according to claim 1, wherein the copolymer is applied in the form of a 1 to 50 wt% solution to the solid materials.

14. A method according to claim 13, wherein the solvent is selected from the group consisting of aromatic hydrocarbons, ketones, ethers, esters and amides.

15. A method according to claim 1, wherein the hydrocarbon or halohydrocarbon groups for $R^I$ and $R^{II}$ are alkyl, alkenyl, aryl, alkylaryl, aralkyl or cycloalkyl groups or halogen-substituted derivatives thereof.

16. A method according to claim 1, wherein the interpolymer is an alternating interpolymer.

17. A method according to claim 1, wherein the copolymer contains at least one additive selected from the group consisting of extenders, fillers, softeners, hardeners, tackifiers and stabilizers.

18. A method according to claim 1, wherein the copolymer is used in combination with a thermosetting type adhesive, a thermoplastic type adhesive or an elastomer type adhesive.

19. A method according to claim 1, wherein the copolymer is applied in the molten state to the solid materials.

* * * * *